United States Patent [19]

Shattuck

[11] 3,990,618
[45] Nov. 9, 1976

[54] SPARE TIRE MOUNT FOR PICK-UP TRUCKS

[76] Inventor: William N. Shattuck, Box 615, Alto, Tex. 75925

[22] Filed: Nov. 6, 1975

[21] Appl. No.: 629,498

Related U.S. Application Data

[63] Continuation-in-part of Ser. No. 554,323, Feb. 28, 1975, abandoned.

[52] U.S. Cl. .......................... 224/42.24; 224/42.25; 211/23
[51] Int. Cl.² ......................................... B62D 43/08
[58] Field of Search........... 224/42.24, 42.25, 42.12, 224/42.06, 42.13, 42.32, 42.33, 42.45 R, 42.46 R, 29 R; 70/229, 230, 232, 231; 214/451, 454; 211/23, 24, 4, 8

[56] References Cited
UNITED STATES PATENTS

| 1,629,478 | 5/1927 | Llark | 224/42.12 |
| 2,285,541 | 6/1942 | Swift | 70/232 X |
| 2,701,670 | 2/1955 | Hutchinson | 224/42.24 |
| 3,613,972 | 10/1971 | Daughhetee | 224/42.24 |
| 3,688,954 | 9/1972 | Neal | 224/42.24 |
| 3,782,775 | 1/1974 | Weiler et al. | 224/42.45 R |

Primary Examiner—Robert J. Spar
Assistant Examiner—Jerold M. Forsberg

[57] ABSTRACT

A mounting bracket and cooperating clamp grip the cargo box side wall of a pick-up truck beneath the customary bead at the top margin of the cargo box. The spare tire is bolted to a projecting arm of the mounting bracket and a lockable hasp device or guard encloses the bolting means for the spare tire and wheel. The mount is compact and stable and positions the spare tire conveniently.

9 Claims, 7 Drawing Figures

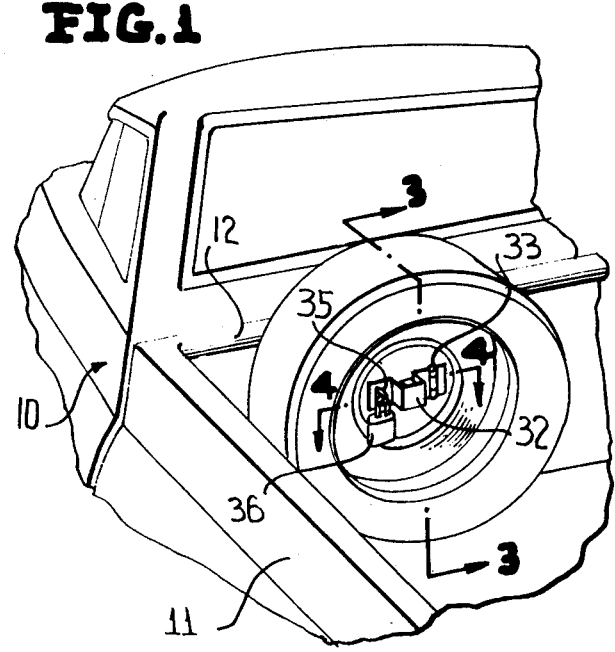
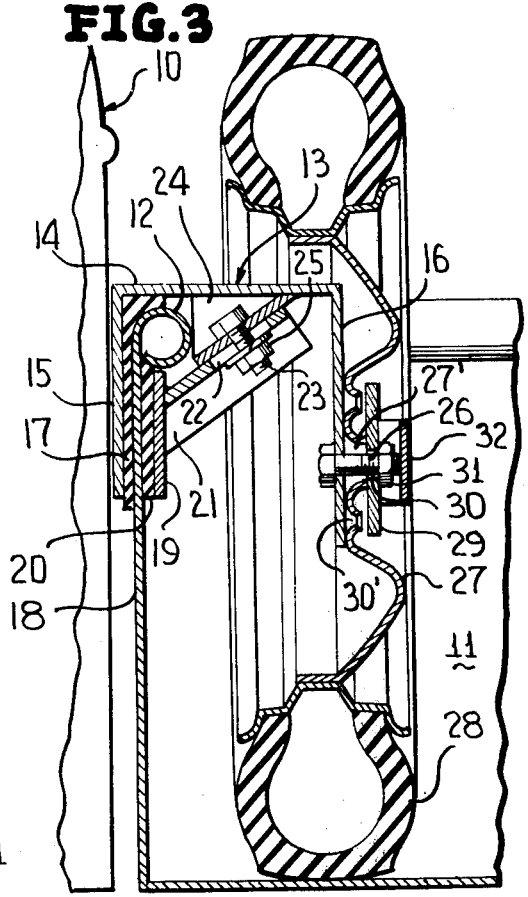
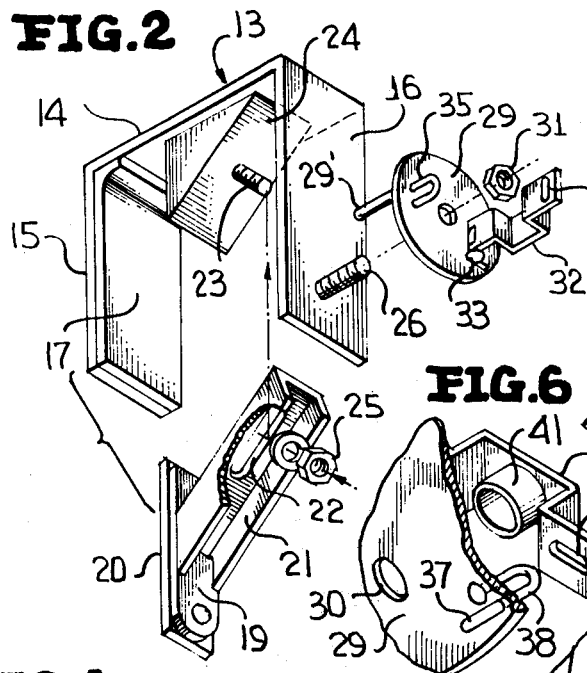
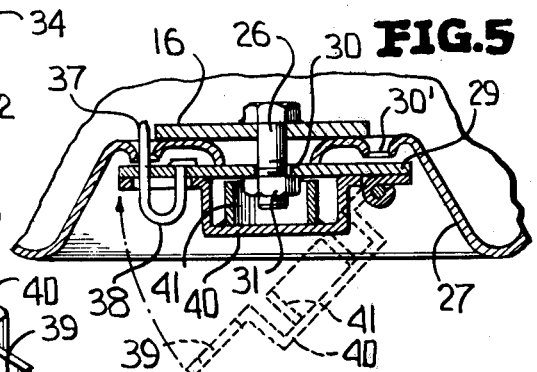
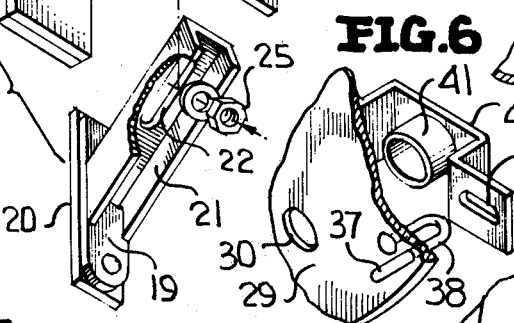
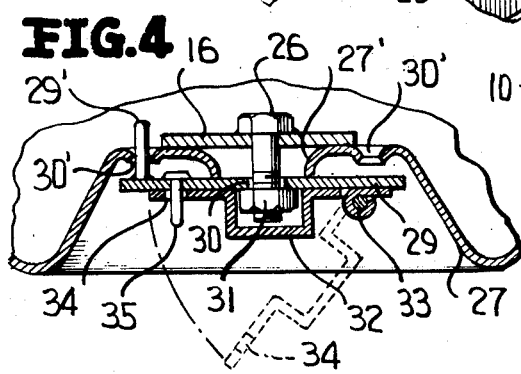
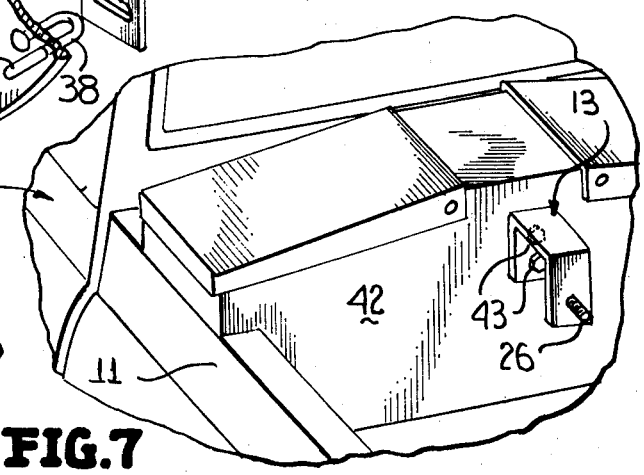

SPARE TIRE MOUNT FOR PICK-UP TRUCKS

BACKGROUND OF THE INVENTION

A need exists for a spare tire mounting or holding means within the cargo box of a pick-up truck. Some pick-up trucks have spare tire mounts at the rear of the cargo box and beneath the floor thereof. If an additional spare tire and wheel are carried, they are usually placed loosely in the cargo box and are subject to movement and are easily stolen.

The present invention, therefore, has for its objective the provision of a spare tire and wheel mount in a pick-up truck cargo box at a convenient and readily accessible location and out of the way of other cargo. The spare tire mount is sturdy and secure and features a clamping means which may grip any side wall portion of the cargo box around the perimeter of the box, thereby rendering the placement of the mount variable at the will of the user. The clamping means of the mount is padded to prevent damaging the painted wall of the truck cargo box. Advantage is taken of the existence of an upper marginal bead found on standard pick-up trucks in cooperating with mount clamping means so as to provide stability for the spare tire mount. The weight of the spare tire and wheel is borne by the cargo box floor. The mount may also be installed on the side wall of a tool box where such a box is employed.

Other features and advantages of the invention will become apparent during the course of the following description.

BRIEF DESCRIPTION OF DRAWING FIGURES

FIG. 1 is a fragmentary perspective view of a pick-up truck equipped with the spare tire mount embodying the invention.

FIG. 2 is an exploded perspective view of the elements forming the mount.

FIG. 3 is an enlarged vertical section taken on line 3—3 of FIG. 1.

FIG. 4 is a fragmentary horizontal section taken through a hasp guard and associated elements of the mount, on line 4—4 of FIG. 1.

FIG. 5 is a fragmentary section, similar to FIG. 4, showing a modification.

FIG. 6 is a fragmentary perspective view of portions of the invention in FIG. 5.

FIG. 7 is a fragmentary perspective view showing another modification.

DETAILED DESCRIPTION

Referring to the drawings in detail wherein like numerals designate like parts, and referring first to FIGS. 1 through 4, the numeral 10 designates a conventional pick-up truck whose cargo box 11 is provided around its top margin with a continuous bead 12 in the interest of strength and rigidity. This construction is standard on all pick-up trucks, although the cross sectional form of the bead 12 may vary from truck-to-truck.

The present invention comprises a primary mounting bracket 13, or holder, which is in the general form of an inverted U when in the installed position, FIG. 3. The bracket 13 has a top horizontal bar 14 and two spaced parallel depending arms or sections 15 and 16, the arm 16 being somewhat longer than the arm 15, as illustrated. The top bar 14 is preferably substantially at right angles to the parallel arms 15 and 16. The interior face of the arm 15 carries a pad 17 of rubber-like material for direct engagement with the opposing exterior surface of one cargo box vertical wall 18 to avoid scratching or marring this wall. The invention can be installed on any selected vertical wall of the cargo box and is therefore versatile.

A cooperating clamp plate 19 has its exterior face covered by a rubber-like pad 20 which engages the interior of the cargo box wall 18 when the device is installed. The plate 19 and its pad 20 are disposed immediately beneath the bead 12, FIG. 3, and thus are positively locked against upward displacement. The horizontal bar 14 is immediately above the bead 12 when the invention is installed and precludes downward movement of the mount on the vertical wall 18. Additionally, the spare tire 28 mounted on spare wheel 27 rests on the floor of cargo box 11 and bears its own weight and also prevents downward displacement of the invention. The invention merely holds the spare tire and wheel in the upright position and prevents removal thereof from the pick-up truck but does not support the weight of the tire and wheel.

A cooperating inclined stabilizing bar 21, preferably of channel cross-section, is welded to the plate 19 and projects upwardly and rearwardly therefrom at an angle near and below the horizontal bar 14 and between the arms 15 and 16. The bar 21 projects above the plate 19 and has a longitudinal adjustment slot 22 in its upper web, receiving a clamping bolt 23, or stud, carried by a triangular support element 24, rigidly secured by welding to the bottom of horizontal bar 14 substantially midway between the vertical arms 15 and 16. The inclination of the bottom wall of the support element 24 matches the degree of inclination of stabilizing bar 21. The bolt 23 receives a nut and washer indicated at 25 to complete the clamped installation of the mount on the cargo box wall 18 following proper adjustment. In connection with the arrangement of the elements 21, 23 and 24, it is to be noted that the bolt or stud 23, as well as the nut 25, are substantially enclosed between the side webs of stabilizing bar 21 and support element 24. Additionally, with the spare tire and wheel in place close to the vertical wall 18, it is impossible for a person to reach the elements 23 or 25 by hand or with a tool to separate them.

The vertical arm 16 spaced from the wall 18 has a bolt or stud 26 welded thereto near its lower end and projecting outwardly thereof to pass through the center opening 27' of spare wheel 27, as shown. A disc or plate 29 of flat configuration has a center opening 30 receiving the bolt 26, and this disc abuts the outer side of the wheel 27 and is clamped thereto firmly by a nut 31 applied to the bolt 26. Thus, the spare tire and wheel are securely anchored to the vertical arm 18 of bracket 13.

To prevent rotation of the disc 29 and possible loosening of nut 31, a rigid pin element 29' is secured by welding to the disc near one side thereof and extends forwardly of the disc, FIG. 4, and is received through one of the wheel openings 30'. The projecting pin element 29' extends near one vertical edge of the arm 16 so that this fixed arm will block and prevent rotation of the disc 29.

As a further anti-theft provision, a hasp guard 32 is hinged at 33 to the other side of disc 29 and is adapted to be positioned across and over the bolt 26 and nut 31 to guard these elements. The center offset portion of the hasp guard 32 which receives the nut 31 preferably is formed for close-fitting engagement over the nut so as to make it virtually impossible to disturb the nut with a tool. The hasp guard 32 has an end slot 34 receiving a U-shaped padlock anchor 35 on the disc 29 and projecting oppositely from pin element 29', FIG. 4. A padlock 36, FIG. 1, is employed to secure the hasp guard 32 in its protective position.

FIGS. 5 and 6 show a modification of the invention where, in lieu of the pin element 29', an equivalent pin element 37 is formed as an extension on one side or arm of the padlock anchor 38, the latter being turned 90° from the position of the anchor 35, previously described. Also, the slot 39 in hasp guard 40 is rotated 90°, FIG. 6, from the position of slot 34 in FIG. 2. The pin extension 37 functions in exactly the same manner as the pin element 29' to prevent rotation of disc 29 and consequent loosening of nut 31.

As an additional safety or anti-theft feature which is optional, FIGS. 5 and 6, a fixed sleeve 41 or guard element on the interior of hasp guard 40 may be provided to fit closely over the nut 31 and thereby substantially completely enclose the same. If desired, this feature may also be employed on the hasp guard 32, previously described in the embodiment of FIGS. 1 through 4.

FIG. 7 shows another modification of the invention wherein the pick-up truck is equipped with a tool box 42 in its cargo box 11, to which it is desired to attach a spare tire and wheel. In this case, the clamping components 19, 21, 24, etc. may be eliminated and the previously-described bracket 13 is bolted directly to the side wall of the tool box as at 43. The elements 26, 29, 31, 32, etc. shown in FIG. 3 are employed in the same manner to attach the spare tire and wheel to the mounting bracket 13 in FIG. 7. These elements are omitted in FIG. 7 for simplicity of illustration and to avoid duplication in the drawings.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A spare tire mount for a pick-up truck having a cargo box including a top marginal bead, said mount comprising an inverted U-shaped bracket having a first arm engageable with the outer face of a cargo box upstanding wall and a second substantially vertical arm spaced from the first arm and inwardly of said wall, a coacting clamp means including a plate element engageable with the interior face of said wall in opposing relation to said arm with the plate element arranged immediately below said bead and thereby blocked from upward displacement and a stabilizing arm secured to and projecting from the plate element within the area encompassed by the inverted U-shaped bracket, means adjustably interconnecting the stabilizing arm and the bracket below the top wall of the bracket and between the first and second arms, whereby the first arm and said plate element may be clampingly engaged with said upstanding wall, means for releasably securing a spare tire and wheel to said second arm of the bracket with the spare tire and wheel substantially vertically disposed in near proximity to the upstanding wall and with the spare tire resting on the floor of said cargo box, and said last named means comprising a substantially horizontal threaded element secured to said second arm and projecting outwardly therefrom, an apertured spare wheel clamping disc engaging over said threaded element and including a pin projection extending near one vertical edge of the second arm and preventing rotation of said disc, a clamping nut on said threaded element outwardly of said disc, and a hinged lockable hasp guard on the disc adapted to extend across said clamping nut in closely covering relation thereto blocking access to the clamping nut when in the locked position.

2. The structure of claim 1, and the opposing faces of the first arm and said plate element being padded with compressible material.

3. The structure of claim 1, and said means adjustably interconnecting the stabilizing arm and bracket comprising an inclined support element depending from the top wall of the inverted U-shaped bracket, said stabilizing arm lying below said support element and having substantially the same degree of inclination as the latter and being in sliding engagement therewith, and slotted screw-threaded means connecting said support elements and said stabilizing arm.

4. The structure of claim 3, and said slotted screwthreaded means including a longitudinal slot in the stabilizing arm and threaded bolt means extending through said slot and being engaged with the inclined support element.

5. The structure of claim 4, and said stabilizing arm being channel-shaped in cross section and open downwardly, said bolt means extending between the side webs of the stabilizing arm and partially enclosed thereby.

6. The structure of claim 1, and said hasp guard having a central offset portion forming a close fitting guard element over said clamping nut, a padlock anchor carried by said clamping disc and said hasp guard slotted near its free end to receive said anchor.

7. The structure of claim 6, and said pin projection comprising an extension carried by one side of said padlock anchor, said anchor comprising a rigid substantially U-shaped element on said clamping disc.

8. The structure of claim 1, and a clamping nut receiving and covering sleeve element on the interior of the hasp guard and blocking access to the clamping nut when the hasp guard is in a locked position relative to a spare tire and wheel.

9. The structure of claim 6, and a clamping nut receiving and enclosing sleeve element secured to the interior of said offset portion.

* * * * *